United States Patent [19]

Eibner

[11] 4,241,455
[45] Dec. 23, 1980

[54] DATA RECEIVING AND PROCESSING CIRCUIT

[75] Inventor: Jules A. Eibner, Maple Glen, Pa.

[73] Assignee: Sperry Corporation, New York, N.Y.

[21] Appl. No.: 865,475

[22] Filed: Dec. 29, 1977

[51] Int. Cl.³ .............................................. H04N 9/00
[52] U.S. Cl. ...................... 455/600; 307/351;
307/355; 307/358; 328/117; 328/135; 328/146
[58] Field of Search ............. 307/351, 355, 356, 358;
328/115, 116, 117, 135, 146, 147, 149; 250/199

[56] References Cited

U.S. PATENT DOCUMENTS

| 3,225,213 | 12/1965 | Hinrichs et al. | 328/135 |
|---|---|---|---|
| 3,502,993 | 3/1970 | Schurzinger et al. | 328/146 |
| 3,566,281 | 2/1971 | Baumann | 307/358 |
| 3,599,105 | 8/1971 | Weir et al. | 328/146 |
| 3,599,151 | 8/1971 | Harr | 328/135 |
| 3,609,407 | 9/1971 | Garuts | 328/115 |
| 3,638,183 | 1/1972 | Progler et al. | 328/115 |
| 3,832,577 | 8/1974 | Harr | 307/351 |
| 3,893,180 | 7/1975 | Braun et al. | 307/351 |
| 4,019,048 | 4/1977 | Maione et al. | 250/199 |

Primary Examiner—John C. Martin
Assistant Examiner—Joseph A. Orsino, Jr.
Attorney, Agent, or Firm—John B. Sowell; W. E. Cleaver; M. M. Truex

[57] ABSTRACT

Detected weak signals representative of digital data signals are amplified which produces distorted digital data signals comprising an alternating current (A.C.) voltage signal component and a direct current (D.C.) voltage signal component. A processing circuit filters out the D.C. voltage signal component and converts the A.C. signal component into two substantially D.C. voltage signals representative of the peaks of the A.C. voltage signal component. These substantially D.C. voltage signals are applied across a voltage divider to provide voltage signals representative of the peak voltages of the original detected weak signals and to provide intermediate voltages which are uneffected by changes in magnitude and distortion of the A.C. voltage signal component of the digital data signals.

5 Claims, 7 Drawing Figures

DATA RECEIVING AND PROCESSING CIRCUIT

BACKGROUND OF THE INVENTION

1. Field of the Invention

The present invention is related to receivers of the type which are employed in digital data computer systems. More particularly, the present receiver is adapted to receive weak digital signals in the form of light from fiber-optic waveguides and to process the signals into digital data usable by the computer system and its peripheral equipment. The receiver detects the weak signals and highly amplifies the signals in a manner which ordinarily introduces distortion. Processing circuits are employed to process the distorted amplified signals and to generate a data output representative of the original data signals employed to generate the light signals.

2. Description of the Prior Art

Fiber-optic waveguides are commercially available and are being used as a substitute or replacement for conventional coaxial cables. Fiber-optic waveguides have the disadvantage of transmitting less energy than conventional coaxial cables and the attenuation over a substantial length is much higher than conventional cables. Accordingly, the light energy being received must be detected and highly amplified to be usable in most digital data computing systems.

Typical applications of fiber-optic waveguides are found in the connection between the central processing unit and the associated auxiliary or peripheral equipment in a computing system. In such applications both the central processing unit and the peripheral equipment are operated with digital data signals generally described as square wave pulses presented in coded form. The original digital data in coded form is employed to activate a light generator such as a light emitting diode (LED) which supplies light to one end of the waveguide. A detector, such as an optical diode, receives the light at the other end of the fiber-optic waveguide and generates a weak signal. The weak signal from the optical diode is then amplified and processed to provide a digital data output representative of the original coded digital data which was employed to activate the light generator.

The circuits which receive the light signals, detect, amplify and process the light signals are referred to hereinafter as optical receivers. Optical receivers are known and are in commercial use. Heretofore, optical receivers have highly amplified detected light signals and fed them to a comparator having a reference voltage input. This type of prior art optical receiver introduced problems of pulse width, distortion and usually required an optical receiver having a much higher band width than the frequency of the original digital data. In order to reduce the distortion of the digital data signals in the prior art processing system, the optical receivers were modified or the optical receivers were adapted to use coded systems which had only a fifty percent duty cycle. It is known that coding systems having a fifty percent duty cycle are not representative of coding systems which are capable of the highest frequency and highest density presently being employed in high speed computing systems.

In another form of prior art optical receiver, the output signals from the preamplifier are differentiated and then fed to a flip-flop circuit which generates a square wave output. A prior art system of this type is designed to eliminate the distortions due to the floating A.C. voltage signals, however, this system introduces the problem of responding to noise signals as well as usually requiring a higher band width receiver.

When digital data signals are transmitted at high speeds, the prior art receivers tend to delay and distort the digital data signals, most of the prior art optical receivers have heretofore required at least twice the band width of the digital data signal system.

SUMMARY OF THE INVENTION

It is a principal object of the present invention to provide a novel optical receiver.

It is another object of the present invention to provide an optical receiver which introduces distortion in the preamplification stage and eliminates the distortion in the processing stages to provide a data output replica of the original digital data with a minimum of delay in processing.

It is a more specific object of the present invention to convert digital data signals from an optical detector into a floating A.C. voltage signal and to convert the floating A.C. voltage signal into peak voltages which are symmetrical to a midrange voltage wherein the midrange voltage is unaffected by the change in peak voltages so as to provide usable digital data processing signals for generating a data output signal.

It is a further object of the present invention to provide an error detection circuit in a novel optical receiver circuit.

It is yet another object of the present invention to provide an automatic gain control circuit in a novel optical receiver circuit.

In accordance with these and other objects of the present invention to be disclosed hereinafter, there is provided an optical receiver which comprises an optical detector whose output is connected to a high gain preamplification stage for producing a noisy A.C. voltage signal imposed on a D.C. voltage signal. The D.C. voltage signal is removed in an A.C. coupling filter and the resulting floating A.C. voltage signal is applied to a negative and a positive peak detector. The two peak detector outputs appear as D.C. voltage signals whose magnitudes are affected by the magnitude and duty cycle of the digital data pulses. The D.C. voltage signal outputs are then applied across a voltage divider. The center tap (and intermediate taps) of the voltage divider remains at a fixed relative level intermediate the peak voltages on the voltage divider even though the peak voltages may change with the duty cycle of the coded digital data. The center tap output of the voltage divider is applied to a data recovery output circuit. A disability sensing circuit and an automatic gain control circuit are also connected to the outputs of the peak detectors. The outputs of the optical receiver provides a square wave reproduction of the original digital data employed to activate the light generator and is usable without further processing in the computer system. The disability sensing circuity provides an output signal which indicates when the signals being received by the optical receiver have fallen below a predetermined safe level.

BRIEF DESCRIPTION OF THE DRAWINGS

The foregoing objects and advantages of the novel construction and mode of operation will be made apparent from the detailed description of the accompanied drawings in which.

DESCRIPTION OF THE PREFERRED EMBODIMENT

Figure 1:
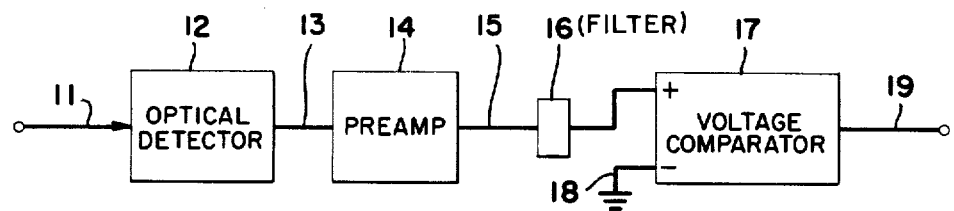
FIG. 1 is a block diagram of a first typical prior art receiver.

In FIG. 1 of the prior art the light signal on fiber-optic waveguide 11 is applied to the optical detector 12 which generates a weak current signal in response thereto. The current output on line 13 is amplified in a preamplifier 14 to produce a distorted voltage output for reasons to be explained hereinafter. The voltage output on line 15 from preamplifier 14 comprises an alternating current (A.C.) voltage component and a direct current (D.C.) voltage component. Filter 16 is employed to remove the D.C. voltage component before the remaining floating A.C. voltage component is applied to the positive input of the voltage comparator 17. The negative input of the voltage comparator 17 is preferably grounded at line 18 to establish a reference voltage. The recovered data output appears as a signal on line 19, however, the recovered data signal is not an exact replica of the original digital data being applied as light signals to the fiber-optic waveguide 11.

Referring to FIG. 2a there is shown a pulse train of original digital data of the type employed to activate a light generator at the input end of fiber-optic waveguide 11. Pulse wave form 21 is typical of a twenty-five percent duty cycle pulse signal. Pulse wave form 22 is typical of a fifty percent duty cycle pulse signal. Pulse wave form 23 is typical of a seventy-five percent duty cycle pulse signal. The wave form FIG. 2b is a schematic representation of the wave form that will be produced at the output of filter 16 as a result of the pulse wave form FIG. 2a input into the FIG. 1 system. For purposes of explanation of the invention the output pulses from filter 16 are shown in triangular form where in actual practice they will appear more closely as distorted sinusoidal pulse wave forms. Pulse wave form 25 being a twenty-five percent duty cycle pulse has half of its area above the ground reference plane signal 24 and fifty percent below the reference plane 24. Whenever a noise spike 26 occurs which is sufficient to exceed the reference plane 24, an error signal will be produced at the output as will be explained hereinafter. Pulse wave form 27 being a fifty percent duty cycle pulse will appear symmetrical to reference ground plane 24. Pulse wave form 28, a seventy-five percent duty cycle pulse, will appear with half of its area above and half of its area below the reference ground plane 24.

The output signals appearing on line 19 will have a pulse duration similar to that shown in FIG. 2c. Where pulse wave form 25 crosses ground reference plane 24 establishes the width of the positive pulse 29. It will be noted that pulse 29 at the output 19 is of longer duration than the input pulse 21 which is representative of the original digital data input. The output pulse signal 32 generated by the fifty percent duty cycle pulse wave form 27 is the same pulse width as the original digital data input signal 22. The output pulse signal 33 produced by the seventy-five percent duty cycle pulse wave form 28 is of lesser pulse width than the original digital data input signal 23.

The prior art system of FIG. 1 is shown to produce output signals of varying pulse width depending on the duty cycle and is extremely susceptible to producing errors when noise signals appear during any pulse wave form input to the voltage comparator where the noise pulse is sufficient to cross the ground reference plane 24. The noise spike 26 is shown of sufficient magnitude to cross the ground plane 24 and will produce an error pulse 31 as shown in FIG. 2c.

Figure 3:
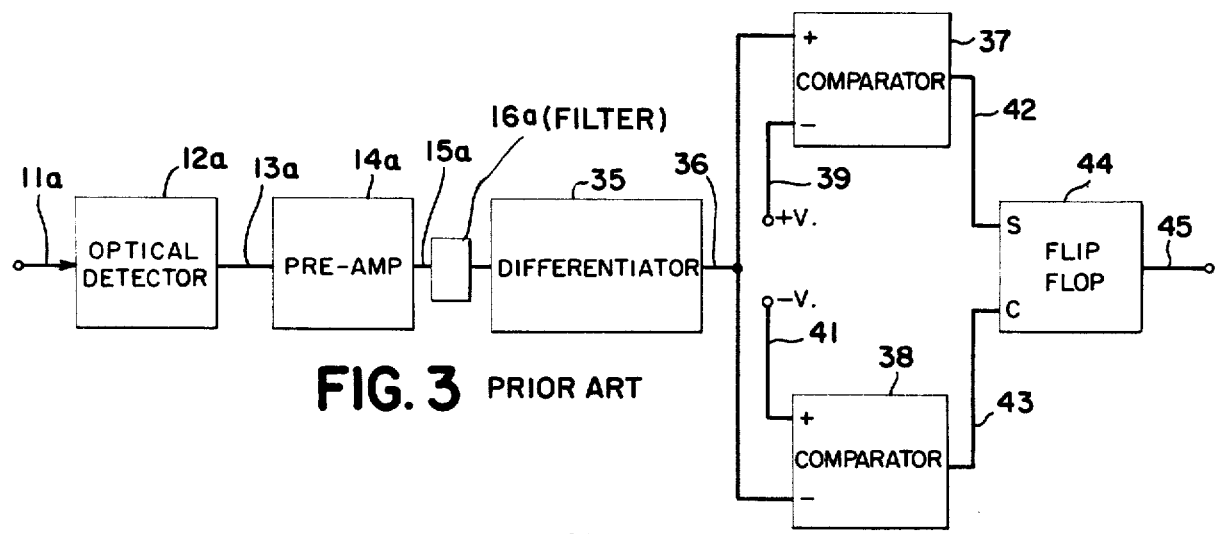
FIG. 3 is a block diagram of a second typical prior art receiver.

In prior art FIG. 3 the light signal on fiber-optic waveguide 11a is applied to optical detector 12a which generates a weak current signal at output line 13a. The current on line 13a is amplified in the preamplifier stage 14a to produce a distorted voltage output on line 15a in the same manner as discussed hereinbefore with regard to FIG. 1. The voltage output on line 15a is filtered in filter 16a to remove the D.C. voltage component before the remain floating A.C. voltage component is applied to the differentiator 35. The output of differentiator 35 on line 36 is coupled to two comparators 37 and 38. The second input to comparator 37 is a reference voltage +V. on line 39. The second input to comparator 38 is a reference voltage −V. on line 41. The output of comparator 37 is applied via line 42 as the set signal to flip-flop 44. The output of comparator 38 is applied via line 43 as the clear or reset signal to flip-flop 44. The output signal from flip-flop 44 on output line 45 is a voltage signal representative of the original digital data signal employed to generate the light signal appearing on optic-fiber waveguide 11a.

Figure 2:
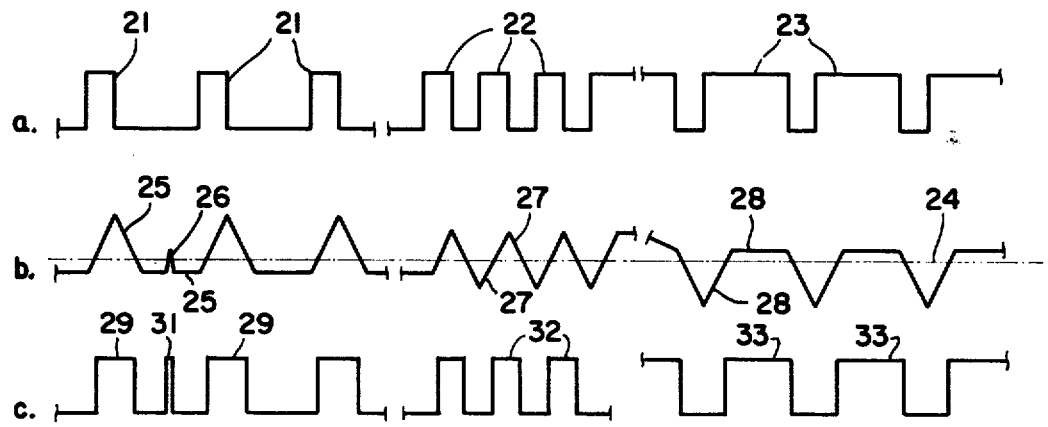
FIG. 2 is a schematic drawing of pulses and wave forms found in the FIG. 1 construction.
Figure 4:
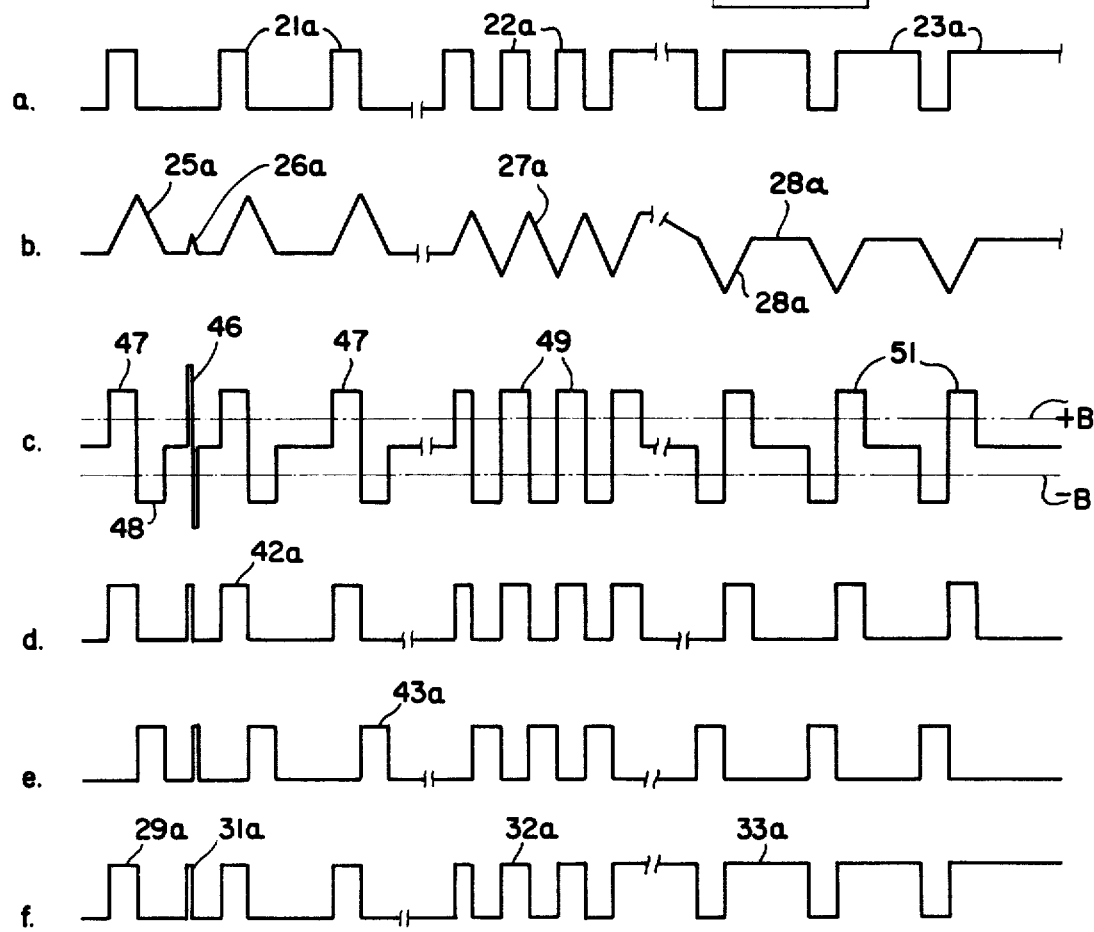
FIG. 4 is a schematic drawing of pulses and wave forms found in the FIG. 3 construction.

Refer now to FIG. 4 showing pulse wave forms a and b which are substantially the same as those previously described with regards to FIG. 2 wave forms a and b. Accordingly, the wave forms a and b of FIG. 4 have been lettered with suffix designations a to denote the similar pulse wave forms. Since pulse wave form 25a at the output of filter 16a is not applied to a voltage comparator having a reference ground, there is no reference ground shown on FIG. 4b. The FIG. 4b wave form is applied to the input of differentiator 35 and produces the wave form FIG. 4c. It will be noted that the slope of the noise spike 26a is steeper than the digital data wave form 25a and produces a larger output wave form 46 than the data pulse 47. The positive portion of the pulse wave form FIG. 4c is shown as pulse 47 which is applied to the positive input of comparator 37 and is compared with a reference level +V. on line 39 to produce an output pulse on line 42 which is applied to flip-flop 44 as the set pulse. The negative pulse 48 appears at the output of differentiator 35 on line 36 as the negative input to comparator 38. A negative reference level −V. is applied to the positive input of the comparator 38 to produce an output on line 43 as the reset or clear signal to flip-flop 44.

The floating A.C. voltage signals 27a and 28a at the output of filter 16a produce signals 49 and 51 respectively at the output of differentiator 35. The mode of operation of these signals are similar to the mode of operation of signals 25a having a twenty-five percent duty cycle. In the system shown in FIG. 3, the pulse wave form FIG. 4d will appear on line 42 as pulse 42a and the pulse wave form FIG. 4e will appear on line 43 as pulses 43a to generate the pulse wave form of FIG. 4f on output line 45 shown as 29a, 31a, 32a and 33a.

While the prior art system of FIG. 3 does maintain the same pulse width as the original digital data input, it will be noted that any noise spike having a slope greater than the sinusiodal input will create an output pulse 46 from the differentiator 35 which has a greater magnitude than the digital data pulses 47 and 48. As explained hereinbefore the pulse wave form of FIG. 4b is shown to have a constant slope when in fact it has a more sinusoidal shape. Accordingly, the pulse wave form of FIG. 4c have been shown as square wave pulses when in fact they would be distorted sine wave pulses.

Figure 5:
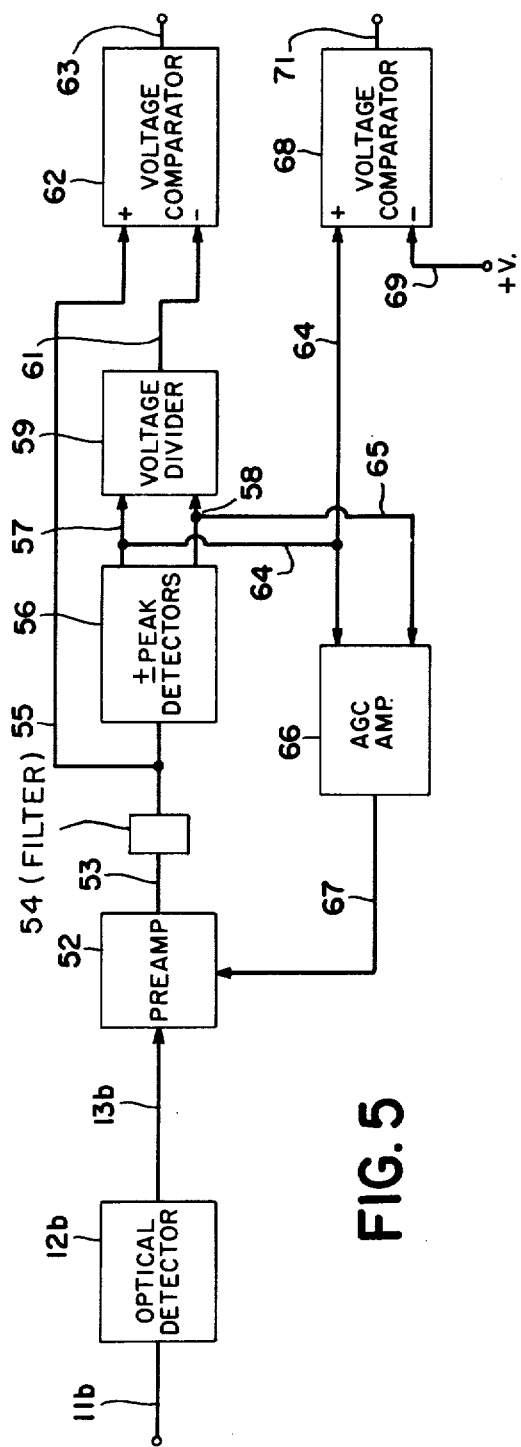
FIG. 5 is a block diagram of a preferred embodiment of the present invention.

Refer now to the block diagram of the preferred embodiment of FIG. 5. The light signal on fiber-optic waveguide 11b is applied to the optical detector 12b to produce an output on line 13b which is applied to an improved preamplifier 52. The output of improved preamplifier 52 on line 53 is applied to filter 54 to generate a floating A.C. voltage signal which is applied via line 55 to the plus and minus peak detectors 56 to generate a substantially D.C. positive voltage on line 57 and a substantially D.C. negative voltage on line 58 which are applied to voltage divider 59. The output of voltage divider 59 is applied via line 61 to the negative input of comparator 62 as a reference voltage. The floating A.C. signal from the filter 54 is applied via line 55 to the positive input of voltage comparator 62 to produce an exact representation of the original data signal on output line 63.

The substantially D.C. voltage outputs from the peak detectors 56 are applied as a parallel input on lines 64 and 65 to the input of an automatic gain control (AGC) amplifier to control the gain of the novel preamplifier 52. The magnitude of the substantially D.C. voltage appearing on positive peak output line 57 is an indication of the strength of the digital data signal being received by the optical receiver. The positive voltage signal on line 57 may be applied via line 64 to the positive input of voltage comparator 68. A predetermined reference voltage +V. is applied via line 69 to the negative input of voltage comparator 68. Thus, when the output voltage from the positive peak detector indicates that a weak signal is being received the voltage comparator 68 will produce an output signal on output line 71 indicative of a weakened or disabled condition.

Figure 6:
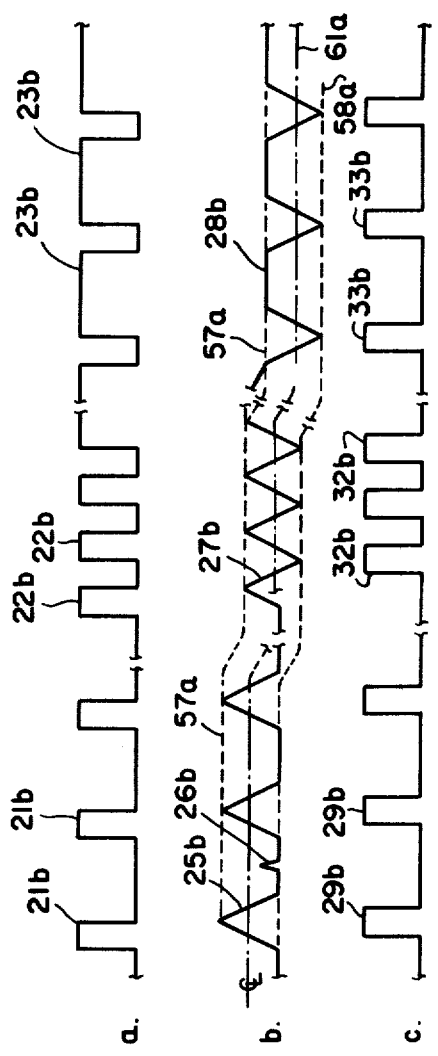
FIG. 6 is a schematic drawing of pulses and wave forms found in the FIG. 5 constructions.

The pulse wave form of FIG. 6a showing original data pulses 21b, 22b and 23b is identical to those described hereinbefore with regards to FIGS. 2 and 4. Pulse wave forms 21b, 22b, and 23b produce pulse wave forms 25b, 27b and 28b respectively at the output of filter 54. The positive peaks of these pulses are shown by reference line 57a and the negative peaks of these pulses are shown by reference line 58a which form an envelope for the pulses. By applying the substantially D.C. voltage outputs from peak detectors 56 across a voltage divider and taking an output from the center tap 60 on line 61 there is produced a reference voltage midway between lines 57a and 58a at reference line 61a. It will be understood that the magnitude of pulses 25b, 27b and 28b may change with the strength of the input on line 13b but the reference voltage level 61a will always be maintained at the midpoint between the peaks of the output voltages from peak detector 56. Since the reference voltage on line 61 is applied to the negative input of voltage comparator 62 and is maintained midway between the peaks of the voltages being applied to the positive input of voltage comparator 62 via line 55, the width of the pulses shown on FIG. 6c will always be the width of the original pulses being applied to the system as shown on FIG. 6a. It will be noted that the noise spike 26b shown in FIG. 6b has the same magnitude as the noise spike in FIGS. 2 and 4 but is insufficient to reach the voltage reference level at 61a and accordingly does not produce an output on line 63. In FIG. 2 the amplitude of noise spike 26 crosses the reference threshold 24 which is one-fourth of the height of the peak to peak amplitude of pulse 25, but does not cross the threshold reference 61a which is fifty percent of the heigth of the peak to peak amplitude of pulse 25b. An advantage of the system of FIG. 5 is that the band width of the receiver does not need to be wider than the band width of the input digital data signals.

Figure 7:
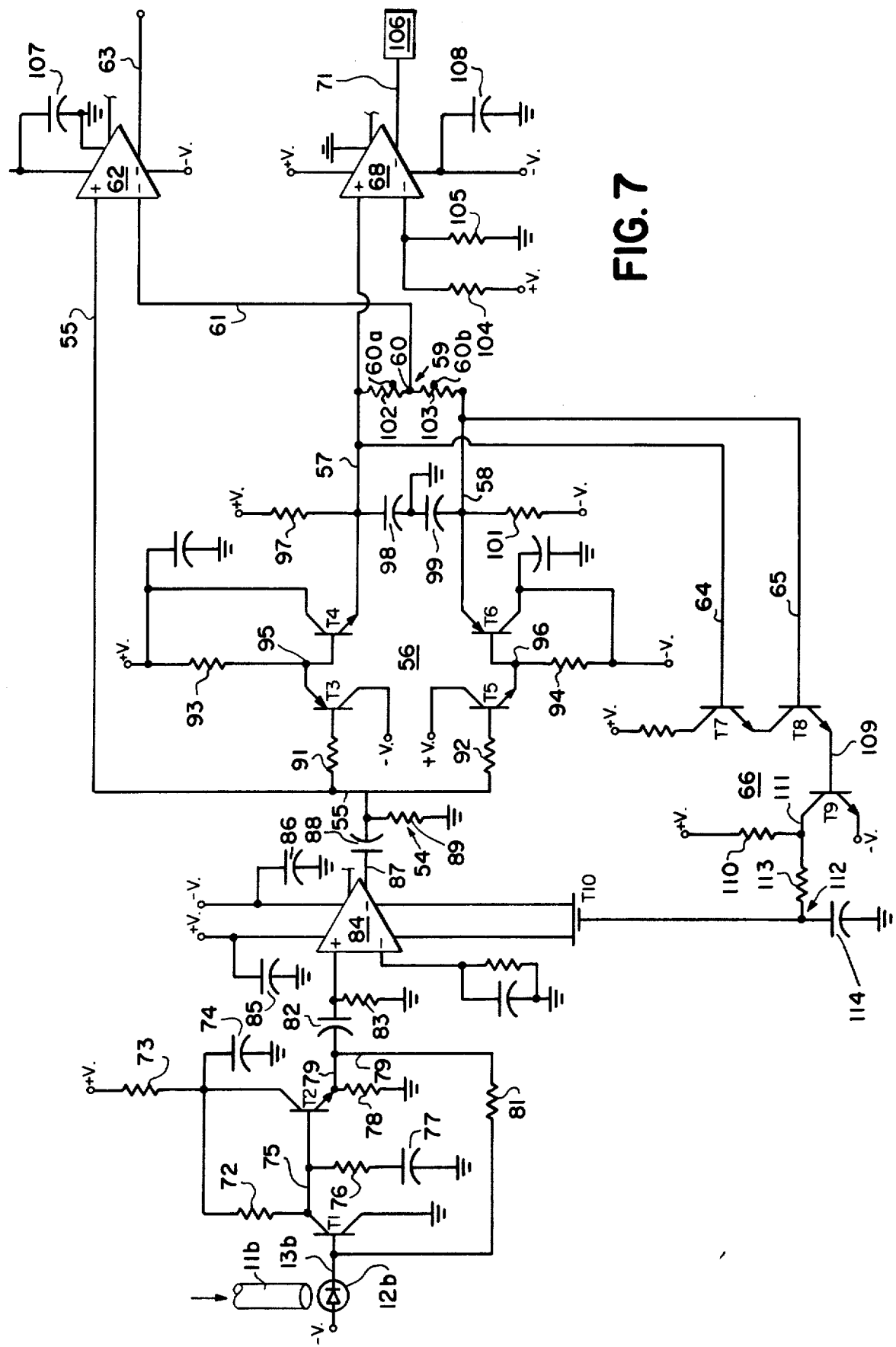
FIG. 7 is a detailed schematic circuit diagram of the preferred embodiment of the FIG. 5 construction.

Refer now to FIG. 7 showing a detailed schematic circuit of the preferred embodiment. The light signal on waveguide 11b is converted to a current on line 13b by optical diode 12b. The current input on the base of transistor T1 is amplified generating an output across load resistor 72 which is fed by a decoupled power supply comprising resistor 73 and capacitor on line 75 is applied to the base of emitter follower transistor T2 providing an output across load resistor 78 equaling the signal appearing on line 75. The output at the emitter of transistor T2 on line 79 is fed back to the input base of transistor T1 through feedback resistor 81. A compensation network comprising resistor 76 and capacitor 77 is employed to stabilize the feedback on line 79. The advantage of this transimpedance amplifier is that the voltage at the output of transistor T2 on line 79 is approximately equal to the current being applied on line 13b times the feedback resistor 81.

The output of transistor T2 on line 79 is applied through an A.C. coupling filter comprising capacitor 82 and resistor 83, to the positive input of linear amplifier 84. In the preferred embodiment, linear amplifier 84 may be a uA733 linear amplifier made by Fairchild Semiconductor. The power supplies +V. and −V. for linear amplifier 84 are decoupled by capacitors 85 and 86 respectively. The negative output from linear amplifier 84 on line 87 is A.C. coupled through filter 54, comprising capacitor 88 and resistor 89, to the plus or minus peak detector 56. The floating A.C. signal mentioned hereinbefore appears on line 55 and is applied through resistors 91 and 92 to the base of emitter follower transistors T3 and T5 respectively. The output of emitter follower transistors T3 and T5 appear across the load resistors 93 and 94 respectively and are equal in amplitude to the signal on line 55 minus the diode drop of the base emitter junction of the emitter follower transistors T3 and T5 respectively. The signals appearing at points 95 and 96 of the bases of transistors T4 and T6 are coupled through the transistors to the loads comprising resistors 97 and capacitors 98 and resistor 101 and capacitor 99 respectively. The effect of coupling transistor T4 to the load 97, 98 is effectively charge capacitor 98 to within one diode drop of the peak voltage appearing at point 95. Similarly, the effect of coupling transistor T6 to the capacitor 99 is to effectively charge capacitor 99 to within one diode drop of the negative voltage peak appearing at point 96. The diode drop across transistor T4 will be compensated for by the diode drop across transistor T3 and the diode drop across transistor T6 will be compensated for by the diode drop across T5. In the preferred embodiment, matched transistors have been employed to assure that the diode drops are equal and self-compensating. Accordingly, the output voltages appearing on the output peak detector lines 57 and 58 are true representations of the peak voltages being applied to the input of the positive and negative peak detectors at line 55. The outputs of the positive and negative peak detectors on lines 75 and 58 are applied across voltage divider 59 comprising matched resistors 102 and 103. In the preferred embodiment shown, a center tap line is connected between the matched resistors 102 and 103 to provide a voltage level which maintains itself half way between the peak to peak voltages appearing on lines 57 and 58. The ouput on center tap line 61 is applied to the negative input of comparator 62. The floating A.C. voltage signal on line 55 is applied to the positive input of voltage comparator 62 to provide a digital data output signal on line 63 which is identical to the original digital data input signal referred to hereinbefore.

The output of the positive peak detector on line 57 is applied to the positive input of a comparator 68. A predetermined reference voltage supplied by the +V. power supply and resistors 104 and 105 is applied to the negative terminal of comparator 68 to establish the reference voltage. The output of comparator 68 on lines 71 serves as a disability indicating signal applied to a disability indicating device 106 which may comprise an audible and visual signal. Comparators 62 and 68 are shown having their positive and negative power supplies decoupled by capacitors 107 and 108 respectively.

Another feature of the present invention comprises an automatic gain control (AGC) 66 which is applied in series between the output of the peak detectors 56 and the gain inputs of the linear amplifier 84. Lines 64 and 65 are connected in parallel with the voltage outputs of peak detectors 56 on lines 57 and 58. If the difference between the voltages on the lines 64 and 65 exceeds the diode drops of the base emitter junctions of transistors T7 and T8, the transistors T7 and T8 are turned on causing an output to flow in line 109 at the collector of transistor T8 and the base of transistor T9. The current at the base of transistor T9 is amplified in transistor T9 and causes a voltage across the collector load resistor 110. The voltage at the output of transistor T9 on line 111 is applied through a low pass filter 112 comprising resistor 113 and capacitor 114. The output of filter 112 is applied to the gate junction of field effect transistor T10. The source and drain electrodes of field effect transistor T10 are connected in series with the gain controls of linear amplifier 84.

When the voltage difference between lines 64 and 65 is less than two diode drops, transistors T7 and T8 are in the off condition and no current flows through line 109. Transistor T9 is also off and the +V. power supply is applied to the gate of transistor T10 through resistors 110 and 113. When this condition occurs the transistor T10 is turned on and linear amplifier 84 is operated at maximum gain.

When the voltage difference between lines 64 and 65 is greater than two diode drops, transistors T7 and T8 are turned on causing transistor T9 to turn on. The negative power supply −V. is now applied through transistor T9 and resistor 113 to the gate of transistor T10. The negative voltage applied to the gate of transistor T10 pinches off the current in transistor T10 and causes the linear amplifier 84 to operate at minimum gain.

Having explained the feedback conditions to automatic gain control 66, it will be understood that the linear amplifier 84 is constantly trying to adjust itself to a condition where the difference between lines 64 and 65 is equal to two diode drops of the base emitter junctions of T7 and T8.

The novel optical receiver has been executed with the fewest possible components and made simple by its selection of commercially available components. Modification of the circuit may be made without changing the preferred mode of operation. The disability indicating circuits may be made more sensitive by using as the sensed input the amplified output from the automatic gain control 66. The voltage divider circuit 59 and the output sensing circuits 62 and 68 may be made more complex by employing other forms of voltage dividers and voltage comparators.

Original digital data having more than two voltage levels may be processed and recovered in the same circuits by employing additional increments in the voltage divider 59. The additional intermediate taps 60a and 60b from the voltage divider may be connected to an input of other comparators like comparator 62. The second input of the additional comparators are preferably connected to the floating A.C. voltage signals on line 55 as explained hereinbefore. As many comparators and voltage taps 60a, 60b etc. as there are voltage levels may be employed to establish the plurality of intermediate voltage levels of the original digital data.

There are no critical values of components employed in the preferred embodiment circuit of FIG. 7. The time constant of the positive peak detector 56 comprising transistors T3 and T4 is established by capacitor 98 and parallel load resistors 97 and 102. The time constant of both peak detectors 56 were made shorter than the time constants of the high band pass filters 82, 83 and 88,89 to insure that the peak detectors track or follow the dynamic input changes. The time constant of the peak detectors 56 are substantially longer than the maximum time interval between transitions of the data being processed. To maintain the output voltage of the peak detectors operational, data signals are assumed to be provided continuously, however, refresh signals or other signals may be supplied when operational conditions other than those anticipated exist.

The circuit shown in FIG. 7 may be made from cheap inexpensive commercially available components. For example, all capacitors used are 0.022 microfarid capacitors. The matched transistors in the peak detectors 56 and the automatic gain control 66 may be made from a single chip quad transistor equivalent to Motorola, Inc. part MPQ 6600. Data recovery logic comparators 62 and 68 may be National Semiconductor voltage comparators part LM360. Transistors T1 and T2 in the Transimpedance amplifier were selected for low cost, high frequency and low current; and may be equivalent to Amperex part BFT-24. A low cost fast response optical diode equivalent to Spectronics part SD-5426-2 has been found to be acceptable. All of the above-mentioned components may be made operational with three voltage sources.

Omissions in the preferred embodiment block diagram system shown in FIG. 5 are to the detriment of the system. For example, the omission of filter 54 or automatic gain control 66 or disability detector 68 would result in the elimination of these desirable functions. Additions of more complex circuitry and components would result in delays of the data being processed without any enhancement to the output data being generated on output line 63.

I claim:

1. A circuit for processing weak light signals representative of digital data of the type having variable duty cycles comprising:
   an optical light detector for detecting said digital data light signal, said light signals having an A.C. signal component and a D.C. signal component resulting from a duty cycle other than a fifty percent duty cycle,
   a high-gain preamplifier coupled to said optical light detector for amplifying said A.C. and said D.C. signal components,
   said high-grain preamplifier further providing a second amplified D.C. component signal introduced by said preamplifier,
   a filter connected to the output of said preamplifier for removing both of said D.C. voltage component signals and for producing a floating A.C. voltage signal output,
   a linear amplifier coupled to said preamplifier for amplifying said floating A.C. voltage signal,
   a positive peak detector coupled to said amplified floating A.C. voltage signal for producing a substantially positive floating D.C. voltage representation of the positive peaks of said floating A.C. voltage signal,
   a negative peak detector coupled to said amplified floating A.C. voltage signal for producing a substantially negative floating D.C. voltage representation of the negative peaks of said floating A.C. voltage signal,
   a voltage divider having its two end terminals connected across the positive and the negative floating D.C. voltages which are representative of the peak outputs from said peak detectors,
   said voltage divider having an intermediate voltage tap representative of a predetermined voltage on said voltage divider, and
   a comparator having a first input connected to said intermediate voltage tap of said voltage divider and the other input connected to said floating amplified A.C. voltage signals for producing a voltage output signal representative of said original digital data.

2. A circuit of the type set forth in claim 1 wherein said linear amplifier is provided with gain control inputs and there is further provided,
   an automatic gain control comprising a drive circuit having two inputs connected in parallel with said end terminals of said voltage divider,
   the output of said drive circuit being coupled to the gain control inputs of said linear amplifier.

3. A circuit of the type set forth in claim 2 which further includes a field effect transistor having its source and drain electrodes connected in series with the gain control inputs of said linear amplifier and its gate electrode connected to the output of said drive circuit, whereby, the effective gain of said linear amplifier is adjustable from a maximum gain with no feedback to the minimum gain limit.

4. A circuit of the type set forth in claim 3 which further includes a low frequency integrator connected in series between the output of said drive circuit and the gate electrode of said field effect transistor.

5. A method of processing weak amplified original digital data signals of the type having an A.C. voltage signal component imposed on a D.C. voltage signal component comprising the steps of:
   amplifying said original data signals in a high gain amplifier which produces a second D.C. voltage signal component,
   filtering out the D.C. voltage signal components leaving a floating A.C. voltage signal component substantially intact,
   amplifying said floating A.C. voltage signal without introducing a substantial D.C. voltage signal component,
   detecting the positive and negative peaks of said floating A.C. voltage signal component,
   providing substantially D.C. voltage representation of said positive and said negative peaks of said floating A.C. voltage signal component, p1 applying said substantially D.C. voltage representations of said positive and said negative peaks across a voltage divider to provide a range of voltages intermediate said peak voltages, and
   applying said floating A.C. voltage signal component and an intermediate voltage from said voltage divider to a voltage comparator to provide an output representative of the original digital data.

* * * * *